Nov. 11, 1952 R. TAYLOR 2,617,887

AUTOMATIC SWITCH AS USED IN TELEPHONE SYSTEMS

Filed Nov. 3, 1949 2 SHEETS—SHEET 1

INVENTOR
REGINALD TAYLOR
BY Lippincott & Smith
ATTORNEYS

Nov. 11, 1952 R. TAYLOR 2,617,887

AUTOMATIC SWITCH AS USED IN TELEPHONE SYSTEMS

Filed Nov. 3, 1949 2 SHEETS—SHEET 2

INVENTOR
REGINALD TAYLOR
BY Lippincott & Smith
ATTORNEYS

Patented Nov. 11, 1952 2,617,887

UNITED STATES PATENT OFFICE 2,617,887

AUTOMATIC SWITCH AS USED IN TELEPHONE SYSTEMS

Reginald Taylor, Liverpool, England, assignor to Automatic Telephone & Electric Company Limited, Liverpool, England, a British company Application November 3, 1949, Serial No. 125,300
In Great Britain November 11, 1948

6 Claims. (Cl. 179—18)

The present invention relates to automatic switches of the type used in telephone systems and is more particularly concerned with switches provided with two sets of wipers the required set being connected up in accordance with the route over which the switch is taken into use. The chief object of the invention is to provide improved circuit arrangements for such switches particularly for use as penultimate and final selectors whereby more efficient employment of the penultimate selectors is obtained together with an overall reduction in the number of selector bank contacts and the amount of exchange cabling.

According to the invention in an automatic switch provided with two sets of wipers the selection of which is effected in accordance with the route over which the switch is taken into use, wiper discrimination within the switch is effected by a two-position relay of the type which maintains its contacts in the position to which they were last operated until it is differently energised.

Figures 1, 2:
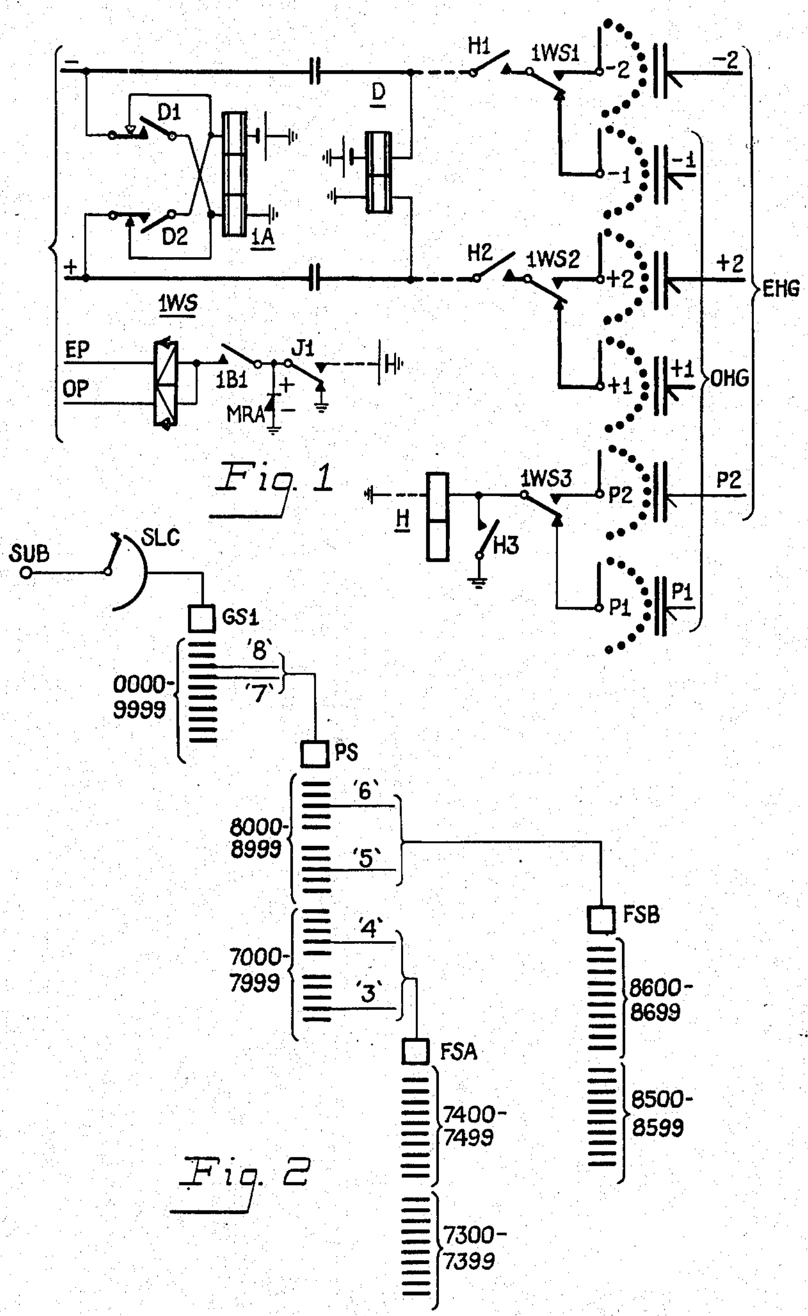
Figure 3:
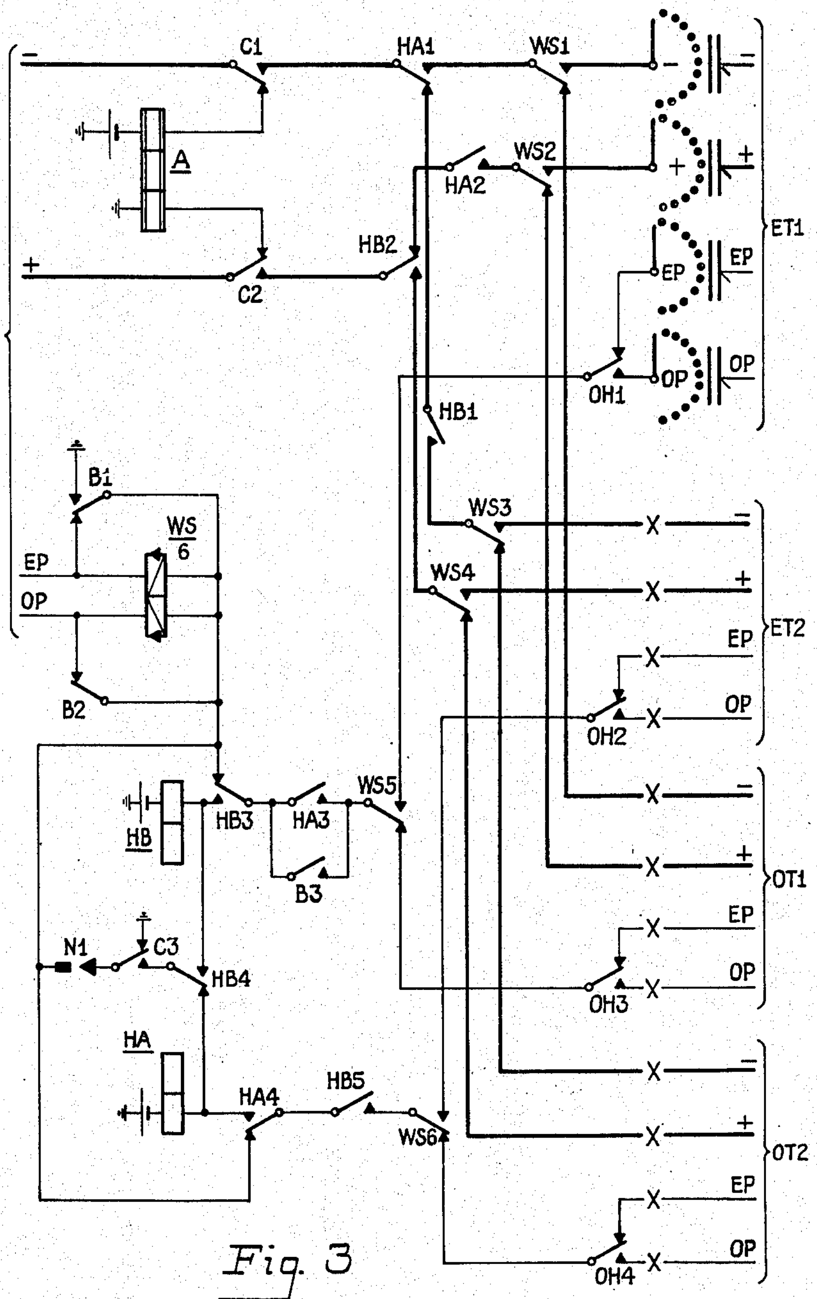

The invention will be better understood from the following description of typical methods of carrying it into effect which are shown applied by way of example to switches of the well-known vertical and rotary type employing so-called rectangular release, and should be read in conjunction with the accompanying drawings comprising Figs. 1 to 3. Fig. 1 includes the wiper-switching elements of a 200-line final selector which provides for routing of a call to one or other of the 100-line groups in accordance with the private wire over which the selector is taken into use. Fig. 2 is a trunking diagram of a 10,000-line telephone exchange embracing final and penultimate selectors embodying the features of the invention. Fig. 3 shows switching elements of a penultimate selector which together with final selectors of the type outlined in Fig. 1 provides for routing a call to any subscriber's line in two groups of 1000 each, the group being determined by the private wire over which it is taken into use.

Referring to Fig. 1 the skeleton final selector circuit includes a wiper-switching relay IWS which is assumed to be of the magnetic locking type, for instance employing the principles described in U. S. Patent No. 2,270,966, granted January 27, 1942, to Rayner et al. The two windings of the relay are substantially similar and the arrangement of the relay is such that its armature and the contacts IWS1 to IWS3 operated thereby have two positions of rest when neither winding is energised. In the circuit the IWS contacts are shown in the position corresponding to the previous energisation of the lower winding and they are retained in this position due to the permanent magnet embodied in the relay. If the lower winding is again energised by the application of battery to lead OP with contacts IB1 closed, the armature and contacts will not be affected. On the other hand if battery were applied to lead EP to energise the upper winding, the armature would be moved to the alternative position and the contacts would be changed over. Disconnection or subsequent re-energisation of the latter winding is without effect and the contacts are not reverted to their original condition until the lower winding alone is again energised by the application of battery to lead OP with contacts IB1 closed.

The final selector outline in Fig. 1 provides access to any subscriber's line circuit in either of two groups of 100 each, the groups being the odd and even hundreds groups designated OHG and EHG respectively. The switch in addition to being employed in conjunction with penultimate selectors of the type to be later described, may be employed in conjunction with known 200-outlet penultimate selectors, for instance of the type described in U. S. Patent No. 2,504,755, granted April 18, 1950, to this applicant and George Thomas Baker. In this case the cabling between the penultimate and final selectors is so arranged that corresponding contacts on partner levels (say levels 7 and 8) of the former provide a common speech path and separate private wires EP and OP to the latter. Thus by way of example, if digit "7" is dialled to a penultimate selector the wipers are raised to the corresponding level and connection is made by way of an outlet on that level to the —, + and OP leads of a final selector such as that indicated in Fig. 1. Alternatively, if digit "8" is dialled, access may be obtained to the same speech path and the even private lead EP of the final selector by way of level 8 of the penultimate selector bank.

Assuming that the IWS contacts are positioned as shown and that the final selector is found to be idle by a penultimate selector testing on an even bank level, a loop is applied to the speaking conductors to operate relay IA. The guard relay IB (not shown) is operated by relay IA, and at contacts IB1 applies a guarding earth by way of relay IWS to leads EP and OP whereupon relay IWS is actuated by its upper winding which is energised by battery applied by way of an outlet-testing relay in the penultimate selector. Contacts IWS1 and IWS2 thereupon extend the speech path to the —2 and +2 wipers while contacts IWS3 extend the outlet-testing relay H to the P2 wiper. Hence when the units and tens digits are subsequently dialled, the wipers are set, by known controlling means (not shown), on bank contacts associated with the appropriate subscriber's line circuit in the even hundreds group EHG. If this circuit is idle, relay H operates and locks up and closes points in the speaking path, and at contacts H3 applies guarding and seizing earth to lead P2.

It will be apparent that had the 1WS contacts been connecting up the wipers associated with the even hundreds group subscribers when the selector was taken into use as above by way of an even bank level of a penultimate selector, the 1WS relay would have been energised as described over lead EP but the position of the contacts would not have been affected.

Consider now the operation of the circuit when the final selector has been taken into use over an even digit access path as described and later a penultimate selector searching for a free final selector applies a testing condition involving battery to the OP lead. Under these circumstances the guarding condition on the OP lead by way of the lower winding of relay 1WS prevents intrusion by the testing selector and both windings of relay 1WS are energised to substantially the same degree but in opposing senses. The mechanical condition of the relay is however not affected since the armature is then retained by the permanent magnet. The values of the components involved might in fact be arranged so that the flux due to the permanent magnet is sufficient to retain the armature when a plurality of penultimate selectors simultaneously test on the OP lead after the final selector has been taken into use as described.

It will be clear that when the final selector is taken into use over an odd level of the penultimate selector, relay 1WS is energised over its lower winding whereupon its contacts are actuated to or remain in the positions shown in Fig. 1 in order to route the call to a required line circuit in the odd hundreds group OHG.

The final selector is not limited to use only in conjunction with penultimate selectors of the type described in U. S. Patent No. 2,504,755, above mentioned, since it might well be used in a system employing penultimate selectors as described in U. S. Patent application Serial No. 125,299, concurrently filed by this applicant, which employs five-level banks each level being accessible both on the dialling of an even digit and on the dialling of the preceding odd digit. Each outlet on such penultimate selector banks provides a single speech path and two private wire paths to a final selector. The contacts of the odd and even digit discriminating relay embodied in said penultimate selector would be slightly altered from the arrangement shown so that the outlet testing circuit in the penultimate selector would be applied to the EP or OP lead in the final selector according to the even or odd value of the digit dialled, but never to both.

Referring again to Fig 1, when the called subscriber answers, the battery feeding relay D is introduced into the called loop and operates, and in turn causes relay J (not shown) to operate for a short time. Thereupon a positive battery pulse is applied by way of contacts J1, one winding of relay 1WS and lead OP or EP to operate the calling subscriber's meter. At the same time the winding of relay 1WS acting as a current limiter ensures that the positive battery shall not be overloaded and a fuse blown due to any earth momentarily appearing on the OP or EP lead. It may also be noted that when contacts J1 are operated, the positive battery meter pulse also presents a guarding condition to the private wires and further that when contacts J1 are in transit, the guard condition is maintained by earth over rectifier MRA.

Reference will now be made to the penultimate selector circuit shown in skeleton form in Fig. 3 which may be assumed to be included in the trunking diagram, Fig. 2, where it is referred to as PS. It will be noted that the penultimate selector includes a magnetic locking relay WS of the before-mentioned type and this is again associated with incoming private wires OP and EP. The selector is also assumed to employ five-level contact banks and the alternate impulse absorbing arrangement described in the concurrently-filed application, Serial No. 125,999, previously referred to, whereby the wipers are only advanced one step in the primary direction upon each odd impulse. Thus at the conclusion of the train the wipers are set to hunt over the same group of bank contacts whether the digit be an even digit or the preceding odd digit while the odd or even value of the digit determines the condition of the discriminating relay OH.

It will be assumed that the penultimate selector is accessible to first group selectors such as GS1 in Fig. 2 of the type described in U. S. Patent No. 2,504,755 and that corresponding sets of contacts on partner levels (say 7 and 8) of the first selector banks extend to the same penultimate selector, the arrangement being such that when an even thousands digit is dialled connection is made to the − and + speaking leads and the even private wire EP of the penultimate selector whereas when the partner odd digit is dialled connection is made to the same speaking path and the odd private wire OP. The penultimate selector is therefore made accessible by dialling either of two thousands digits. It will be understood that the crosses included in the −, +, EP and OP leads bracketed together and extending to paths ET2, OT1 and OT2 are intended to represent wipers and bank contacts similar to those in the corresponding leads in path ET1.

Assume now that relay WS is resting with its contacts in the position indicated at the instant the penultimate selector is found to be idle by a first selector searching over an appropriate even bank level. Thereupon by virtue of the absence of potential on the private lead EP the first selector drive is cut and a loop is applied to the − and + conductors to operate the impulse receiving relay A. Relay A thereupon operates the guard relay B (not shown) in known manner whereupon contacts B1 and B2 remove the shunt paths from relay WS. The former contacts also apply a guarding earth via the WS windings to the two private leads and enable the testing battery extending over lead EP from the first selector to actuate relay WS. The WS contacts are therefore changed over to their alternative positions and at contacts WS1 and WS2 prepare to extend the incoming speaking conductors to the first choice outlets appropriate to the even thousands digit already dialled while contacts WS3 and WS4 prepare to extend the speaking conductors to the second choice outlets appropriate to the same digit. At the same time contacts WS5 and WS6 prepare to extend the switching relay HB and HA respectively to the first and second choice outlet private wipers associated with ET1 and ET2. Thus in response to a dialled even thousands digit, relay WS has been conditioned to enable the call to be routed by way of any of those groups of final selectors serving the 1000 subscribers appropriate to the said digit. Obviously if the WS contacts had been initially connecting with the even thousands wipers when relay WS was energised over lead EP, the contacts would not have been affected.

In the case of the penultimate selector being seized by way of the partner odd level of a first group selector, the same speaking path of entry as before is employed but the lower winding of relay WS is energised over lead OP so that the relay contacts are actuated to, or are retained in, the positions shown. Consequently the said contacts are conditioned to enable the call to be subsequently routed via a final selector in the remaining groups accessible over the first and second choice outlets OT1 and OT2 and serving a second 1000 subscribers appropriate to the odd digit dialled to the first selector.

When the hundred digit is dialled, the penultimate selector responds and the wipers are set in the vertical direction in the manner described in detail in the previously mentioned U. S. patent application Serial No. 125,299, the wipers being raised a step during each odd impulse only of the train, and relay OH ultimately remaining operated if said digit is odd or released if said digit is even. Thus if the hundreds digit "6" is dialled, the wipers are raised to level 3 and relay OH is released, and furthermore if the penultimate selector had been seized by way of an even first selector bank level, the WS contacts would be in the alternative conditions to those shown. Pursuing the above assumption and noting that relays HA and HB are operated in known manner over circuits completed as the wipers leave the normal position, it follows that the upper winding of relay HB is presented by way of contacts HB3, HA3, WS5 and OH1 to the even private wiper EP associated with outlets ET1, whereas the lower winding of relay HA is presented by way of contacts HA4, HB5, WS6 and OH2 to wiper EP associated with outlets ET2. After a short delay the wipers are advanced into the bank to engage with the first set of bank contacts on level 3 and at that instant the retention of relays HB and HA is made completely dependent upon the condition encountered by the EP wipers. If both outlets encountered are busy, as evidenced by the presence of earth on the EP bank contacts in each case, relays HB and HA remain operated and the wipers are advanced to the succeeding set of bank contacts and so on. On the other hand if both outlets are idle, both relays HA and HB release whereupon relay C, previously released at the end of the hundreds digit impulse train, re-operates and the selector drive is cut in known manner. Relay HA then reoperates over its lower winding from earth via contacts B1, N1, C3 and HB4, and also a guarding earth is extended over contacts B1, HB3, B3, WS5 and OH1 and the first choice EP bank contact to the EP lead of a final selector such as that outlined in Fig. 1. Relay HA ultimately remains operated from the guarding earth returned by the seized final selector over the upper EP wiper and contacts OH1, WS5, HA3, HB3, N1, C3 and HB4. Again, if the first choice outlet is idle and the second choice busy when the final selector wipers encounter the first set of bank contacts, relay HB releases and is followed by relay HA since it is disconnected at contacts HB5. Relay HA however re-operates upon the re-operation of relay C as in the prior case, and the first choice outlet is guarded and taken into use. Finally if the first and second choice outlets are busy and idle respectively when encountered, relay HA releases but relay HB is held, since contacts B3 are closed, by earth extending over the wiper EP bank contacts and ultimately remains operated from guarding earth returned from the seized final selector over the second choice (ET2) EP bank contact and contacts OH2, WS6, HB5, HA4, N1, C3 and HB4. In each case relay C operates in known manner to disconnect relay A which releases, and to extend the calling loop by way of the appropriately operated HA or HB contacts and WS contacts, whereupon a guarding earth is returned over the relevant first or second choice EP bank contact to maintain the HA or HB relay as already indicated. The release of relay A releases relay B which short-circuits the windings of relay WS and connects the guarding earth, returned by the final selector, directly to the incoming EP and OP leads.

It will be evident that if the penultimate selector is taken into use by way of an even level of a first selector as before but this is followed by the dialling of an odd hundreds digit, for example digit "5," the WS contacts are positioned again to employ the even thousands wipers and the wipers are raised to level 3, but the operated contacts OH1 and OH2 ensure, since an outgoing OP private path is employed, that a final selector taken into use over said level is conditioned subsequently to route the call to a subscriber in the odd hundreds group.

If access is obtained to the penultimate selector over an odd level of a first selector, relay WS is energised over its lower winding and the contacts are actuated to, or are maintained, in the condition shown. Contacts WS1 to WS4 consequently determine that a speaking path shall be extended to one of final selectors in the first or second choice group (OT1 or OT2) collectively serving the 1000 subscribers appropriate to the odd thousands digit dialled, while contacts WS5 and WS6 prepare to divert the HB and HA relays to a pair of OT1 and OT2 private wipers. The penultimate selector responds to the hundreds digit in the manner previously outlined, relay OH determining the private wire path of entry OP or EP to the seized final selector in accordance with the odd or even value of said hundreds digit.

The penultimate selector described employs four bank contact assemblies and as previously stated each assembly includes five levels each comprising four rows of eleven contacts each, the first ten being available for trunking purposes. Since four such assemblies are employed it follows that a total of 880 contacts is employed. From the preceding description it will be apparent that in accordance with the thousands and hundreds digits dialled twenty outlets to final selectors are available. However it may be convenient to make only ten available and under these circumstances it will be apparent to those skilled in the art that the circuit could be modified to include a single switching relay, in place of relays HA and HB, and to dispense with all those elements concerned with the second choice outlets. A penultimate selector so arranged would involve a bank contact capacity of 440.

Reference will now be made to the trunking diagram, Fig. 2, which embraces penultimate and final selectors described with reference to Figs. 3 and 1 respectively. When a subscriber SUB removes his receiver to initiate a call, the rotary line switch in the associated subscribers line circuit SLC searches for and finds an idle first group selector GS1. This selector through the intermediary of the penultimate and final selectors enables access to be obtained to any one of 10,000 subscribers numbered from 0000 to 9999. When, by way of example, the thousands digit "8" is dialled, a penultimate selector PS is taken into use over a set of bank contacts on level 8 which provide a separate private wire but a speech path common to the corresponding set of contacts on level 7. The private wire path of entry employed determines that one of the upper pair of bank assemblies, providing access to final selectors serving the 1000 subscribers numbered 8000 to 8999 shall be employed. On the other hand if the thousands digit "7" had been dialled, the private wire path of entry would have determined that one of the lower pair of bank assemblies associated with calls to a second 1000 subscribers numbered 7000 to 7999, would be subsequently employed. Assuming that the thousands digit "8" has been dialled and this is followed by the hundreds digit "6," the penultimate selector wipers are raised to level 3 by virtue of the impulse absorbing feature employed, and the call is routed to a final selector FSB wherein the even private path of access determines that when the appropriate tens and units digits have been dialled the call shall be routed to a subscriber in the group 8600 to 8699. Alternatively if the thousands digit "8" is succeeded by digit "5," the odd private wire path of entry to final selector FSB ensures that the call shall subsequently be routed to a subscriber in the hundreds group designated 8500 to 8599. Taking another example, if the thousands digit "7" is followed by the hundreds digit "4," a final selector FSA, serving the 200 lines 7300 to 7499, is taken into use over level 2 of the penultimate selector bank and in accordance with the even private wire path of entry the call is subsequently routed to a subscriber in the 7400 to 7499 hundreds group. Alternatively when the thousands digit "7" is succeeded by the hundreds digit "3," the odd private wire path of entry to final selector FSA by way of level 2 of the lower bank assembly of the penultimate selector determines that the call shall be routed to the 7300 to 7399 group.

I claim:

1. In a telephone system, a selector switch, two sets of wipers for said switch, two means of access connected with said selector switch for taking it into use, incoming speaking leads common to the means of access, two separate test leads individual respectively to said two means of access, a two-winding two-position relay in said selector switch, one winding of said relay being connected with one of said test leads, the second winding of said relay being connected with the other of said test leads, means including one of the means of access effective incidental to the taking into use of the switch for causing said relay to operate to one position when energized by one of the windings and to maintain said position when energization ceases, means including the other of the means of access also effective incidental to the taking into use of the switch for causing the said relay to assume the second position when energized by the other of said windings and to maintain said last-named position when said energization ceases, and means for selectively rendering operative one or the other of the sets of wipers depending upon the position of the said relay.

2. The switch claimed in claim 1 comprising, in addition, means to polarize the relay.

3. The switch claimed in claim 1 comprising, in addition, means to short-circuit each of the relay windings except during the time period between the instant of taking into use and the completion of setting.

4. The switch claimed in claim 1 comprising, in addition, means to maintain one winding of the relay connected to the test lead during periods of selector switch operation to provide a protective resistance for booster battery metering.

5. In a telephone system, a selector switch, two sets of wipers for said switch each including a first wiper and a second wiper, a set of bank contacts for each of said wipers, a plurality of succeeding switches each having a plurality of sets of wipers, connections extending from said sets of bank contacts to said switches, two means of access connected with said selector switch for taking it into use, incoming speaking leads common to both said means of access, two separate test leads individual respectively to said two means of access, a two-winding two-position relay in said selector switch, one winding of said relay being connected to one of said test leads and the other winding of said relay being connected to the other of said test leads, means including one of the means of access effective incidental to the taking into use of the switch for causing said relay to operate to one position when energized by one of said windings and to maintain said position when energization ceases, means including the other of the means of access also effective incidental to the taking into use of the switch for causing said relay to assume the second position when energized by the other of said windings and to maintain said last-named position when said energization ceases, means for selectively rendering operative one of the sets of wipers of said selector switch depending upon the position of said relay, means responsive to a train of setting impulses including means responsive to the odd impulses of said train for effecting mechanical movement of both said sets of wipers and for transferring control from said first wiper to said second wiper in the set of wipers which has been rendered operative and means responsive to any even impulses of said train of impulses for transferring control from said second wiper to said first wiper in the said operative set of wipers.

6. The switch claimed in claim 5 in which the wipers are arranged to have vertical and rotary movement and the bank for each wiper comprises five levels only.

REGINALD TAYLOR.

REFERENCES CITED

The following references are of record in the file of this patent:

UNITED STATES PATENTS

| Number | Name | Date |
|---|---|---|
| 1,914,384 | Richardson | June 20, 1933 |
| 2,222,126 | Taylor | Nov. 19, 1940 |
| 2,270,966 | Rayner et al. | Jan. 27, 1942 |
| 2,416,109 | Long | Feb. 18, 1947 |

FOREIGN PATENTS

| Number | Country | Date |
|---|---|---|
| 593,049 | Great Britain | Oct. 7, 1947 |